United States Patent
Yuan et al.

(10) Patent No.: US 11,260,408 B2
(45) Date of Patent: Mar. 1, 2022

(54) SPRINKLER FOR ACHIEVING A HIGH ATOMIZATION EFFECT UNDER LOW PRESSURE CONDITION

(71) Applicant: Jiangsu University, Zhenjiang (CN)

(72) Inventors: Shouqi Yuan, Zhenjiang (CN); Xingye Zhu, Zhenjiang (CN); Xinkun Wang, Zhenjiang (CN); Linguo Zhang, Zhenjiang (CN); Mengya Lu, Jiangsu (CN)

(73) Assignee: Jiangsu University, Zhenjiang (CN)

( * ) Notice: Subject to any disclaimer, the term of this patent is extended or adjusted under 35 U.S.C. 154(b) by 33 days.

(21) Appl. No.: 16/337,225

(22) PCT Filed: Mar. 14, 2018

(86) PCT No.: PCT/CN2018/078896
§ 371 (c)(1),
(2) Date: Mar. 27, 2019

(87) PCT Pub. No.: WO2019/144477
PCT Pub. Date: Aug. 1, 2019

(65) Prior Publication Data
US 2021/0354150 A1 Nov. 18, 2021

(30) Foreign Application Priority Data

Jan. 29, 2018 (CN) .......................... 201810084941.6

(51) Int. Cl.
*B05B 3/02* (2006.01)
*B05B 15/65* (2018.01)
(Continued)

(52) U.S. Cl.
CPC ............ *B05B 3/022* (2013.01); *A01G 25/023* (2013.01); *A01M 7/0003* (2013.01); *B05B 15/65* (2018.02)

(58) Field of Classification Search
CPC ....... B05B 3/022; B05B 15/65; A01G 25/023; A01M 7/0003; A01M 7/0014
(Continued)

(56) References Cited

U.S. PATENT DOCUMENTS 3,610,527 A * 10/1971 Ericson ..................... F25C 3/04
239/222.11
3,997,115 A * 12/1976 Licudine ................. B05B 3/022
239/222.11
(Continued)

FOREIGN PATENT DOCUMENTS

CN 205052604 U 3/2016
CN 206199553 U 5/2017
(Continued)

*Primary Examiner* — Steven J Ganey
(74) *Attorney, Agent, or Firm* — Greenberg Traurig, LLP

(57) ABSTRACT

The invention discloses a sprinkler for achieving a high atomization effect under a low pressure condition, which belongs to a modern agricultural micro-irrigation apparatus, and comprises a low-pressure fine atomizing nozzle, a small motor fan, a storage battery pack, slotted brackets, a screw rod and adjustable screw nuts, the components of the sprinkler are connected with each other via threads and bolts, and the slotted bracket has a U-shaped slot. The low-pressure atomizing sprinkler can realize height adjustment of the sprinkler through threaded connection of the threaded connecting pipe according to the height of the plant to be sprinkled, and the operation is simple. Effective atomization can be achieved under a low pressure condition and atomization uniformity can be improved by the action of the small motor fan. The sprinkler for achieving a high atomization effect under a low pressure condition is convenient to assemble, the user can quickly install the sprinkler and achieve different atomization effects according to the requirement, so that a single apparatus has multiple functions and effectively overcome drawbacks of the mechanical (Continued)

Figure 1:
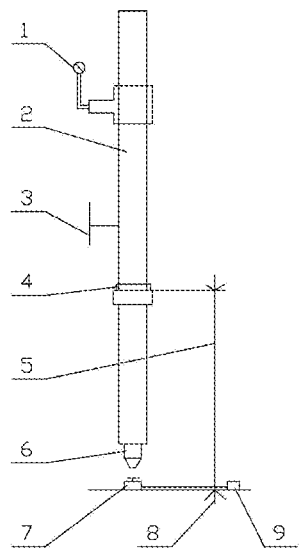

operation and only functioning in pressure adjustment of the agricultural atomizing sprinklers in the prior art.

8 Claims, 1 Drawing Sheet

(51) Int. Cl.
*A01G 25/02* (2006.01)
*A01M 7/00* (2006.01)

(58) Field of Classification Search
USPC .................. 239/222.11, 223, 77; 261/88–90
See application file for complete search history.

(56) References Cited

U.S. PATENT DOCUMENTS

| | | | | |
|---|---|---|---|---|
| 5,373,990 | A | * | 12/1994 | Ballu .................. A01M 7/0014 239/77 |
| 2017/0312704 | A1 | * | 11/2017 | Godinez ................ B05B 3/105 |

FOREIGN PATENT DOCUMENTS

| | | | |
|---|---|---|---|
| CN | 107321521 | A | 11/2017 |
| JP | 2004050128 | A | 2/2004 |
| JP | 2008029986 | A | 2/2008 |
| RU | 2548886 | C1 | 4/2015 |
| SU | 1429991 | A1 | 10/1988 |

\* cited by examiner

SPRINKLER FOR ACHIEVING A HIGH ATOMIZATION EFFECT UNDER LOW PRESSURE CONDITION

CROSS REFERENCE TO RELATED APPLICATIONS

The present application is a 371 U.S. National Stage of International Application No. PCT/CN2018/078896, filed Mar. 14, 2018, which claims the benefit of the earlier filing date of Chinese Patent Application No. 201810084941.6 filed on Jan. 29, 2018, which are each incorporated herein by reference in their entirety.

I. TECHNICAL FIELD

The present invention relates to a key apparatus of micro-irrigation system for water-saving irrigation, which is suitable for solving the problem that the sprinkler fails to realize good atomization and results in poor uniformity under a low pressure condition, and particularly relates to a sprinkler for achieving a high atomization effect under a low pressure condition.

II. BACKGROUND ART

Atomization technology is widely applied in production and life, such as mechanical fuel combustion, agricultural production and medical treatment, etc. Micro-irrigation technique is one of the key techniques in water-saving irrigation. In agricultural production, atomizing sprinklers are usually used for atomizing pesticide application and atomizing air humidification, etc. Mechanical sprinklers are widely applied, and mainly include direct spray nozzles, simple centrifugal nozzles, impinging nozzles and wide-range centrifugal nozzles. However, for most nozzles, under a low pressure (lower than 0.1 MPa) working condition, jet flow of the sprinkler is in the shape of water column or water droplet, so it is hard to realize droplets fragmentation and a poor atomization effect is caused. Moreover, under a low working pressure (lower than 0.1 MPa), sprinkling via a single nozzle also has the problem of poor uniformity. Therefore, it is of great significance to develop a sprinkler for achieving a high atomization effect under a low pressure condition, in order to improve the poor atomization effect under a low pressure (lower than 0.1 MPa) condition, overcome the technical difficulty of achieving a good atomization effect at a lower pressure and improve the uniformity of atomized droplets.

III. CONTENTS OF THE INVENTION

The object of the present invention is to provide a sprinkler for achieving a high atomization effect under a low pressure condition, which can improve the atomization effect of nozzles under low pressure (0.1 MPa) working condition, and has advantages of simple structure, convenient operation, flexible use, high atomization effect, good atomization uniformity, and energy saving, etc. In the present invention, the jet water column or water droplets can be fragmented conveniently and reliably at the outlet of the fluidic element, thereby achieving the high atomization effect under a low pressure condition, and solving the problem of poor atomization effect and poor uniformity of mechanical sprinklers under a low pressure condition.

The technical scheme of the present invention is as follows: a sprinkler for achieving a high atomization effect under a low pressure condition, comprising a threaded connecting pipe, a low-pressure fine atomizing nozzle, a small motor fan, a storage battery pack, a top slotted bracket, a bottom slotted bracket, a screw rod, and adjustable screw nuts, wherein, the low-pressure fine atomizing nozzle is connected to the threaded connecting pipe, and atomization pressure is adjusted via a valve; the screw rod is disposed in parallel on one side of the threaded connecting pipe, the top end of the screw rod is connected to the threaded connecting pipe via the top slotted bracket, the bottom slotted bracket is disposed at the bottom end of the screw rod, the small motor fan is disposed on the bottom slotted bracket and comprises a small motor and a m-blade propeller fan, the small motor fan can move left and right in the U-shaped slot of the bottom slotted bracket to adjust the axial distance from the low-pressure fine atomizing nozzle, the adjustable screw nut can be screwed up and down on the screw rod to adjust the lateral distance between the small motor fan and the low-pressure fine atomizing nozzle, and the storage battery pack supplies power to the small motor fan.

The top slotted bracket comprises a pipe fitting hole and a support plate, and the diameter of the pipe fitting hole is greater than the diameter of the threaded connecting pipe, so that the top slotted bracket can move up and down on the threaded connecting pipe; the pipe fitting hole has a threaded hole in its wall surface, and the top slotted bracket can be fixed by screwing in and out of a bolt with appropriate size in the threaded hole; the support plate is disposed at the other end of the top slotted bracket and has a U-shaped slot X, so that the screw rod can move left and right in the top slotted bracket. An U-shaped slot Y is provided at one end of the bottom slotted bracket, to realize left and right movement and fixing of the small motor fan; an open hole is provided at the other end of the bottom slotted bracket, via which the screw rod is connected between the top slotted bracket and the bottom slotted bracket; the storage battery pack is fixed on one end of the bottom slotted bracket near the open hole, and comprises a battery case that contains n dry battery cells and is disposed at the lower end of the bottom slotted bracket via waterproof wires.

The low-pressure fine atomizing nozzle is connected to the desired threaded connecting pipe via threads, and the pressure can be adjusted by controlling a pressure regulating valve manually or automatically; the fan motor supported by a lateral support frame is disposed right below the sprinkler, and the atomized droplets are fragmented again under the counterforce of impact on the fan plane; the vertical axial distance between the fan and the low-pressure fine atomizing nozzle may be adjusted by moving the adjustable screw nut up or down along the screw rod, so as to achieve the ideal atomization effect at different low pressures; the small motor is powered by the storage battery pack on the right side of the lateral support frame through waterproof wires that run below the slotted bracket to prevent water intrusion.

The small motor fan consists of a small motor and a fan, wherein, the fan is made of a plastic material and has an m-blade propeller with a diameter greater than or equal to the outer diameter of the small motor. The m-blade propeller is a propeller with one or more blades.

The storage battery pack is provided in a battery case which contains n dry battery cells, and supplies power to the small motor via waterproof wires, the waterproof wires run below the slotted bracket to avoid influence by the atomized droplets and ensure connection reliability. The n dry battery cells mean one or more dry battery cells.

The slotted bracket is made of cast iron material and consists of a top slotted bracket and a bottom slotted bracket, a sleeve for the threaded connecting pipe is disposed at the left end of the top slotted bracket and has a threaded hole at the rim of the sleeve, and the height of the top slotted bracket can be fixed by screwing a bolt in and out of the threaded hole. The connecting sleeve has a U-shaped slot X. The bottom slotted bracket has a U-shaped slot Y at its left end and a hole with the same diameter as the screw rod at its right end, and the battery case can be fixed at the right of the hole.

The screw rod is a cast iron pole with threads along its full length, and is provided with an adjustable screw nut at its top end and bottom end respectively, the distance between the bottom slotted bracket and the top slotted bracket can be adjusted by turning the adjustable screw nuts, so as to ensure appropriate distance between the installed small fan and the low-pressure fine atomizing nozzle and thereby achieve a better atomization effect.

The adjustable screw nut is made of cast iron material, its middle is a screw nut with the same diameter as the threaded rod, and two small iron plates are welded to the top end of the screw nut.

The present invention has the advantages of simple structure, convenient adjustment, realizing effective fragmentation of atomized droplets under a low pressure condition to ensure the quality of atomization, and having a highly adjustable structure to meet the requirement for different atomization effects.

IV. DESCRIPTION OF DRAWINGS

Figure 2A:
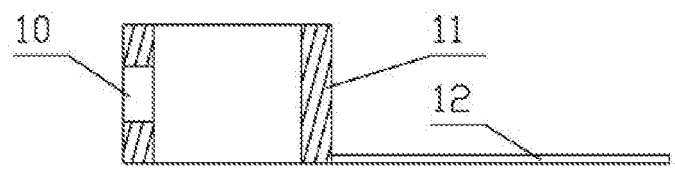
Figure 2B:
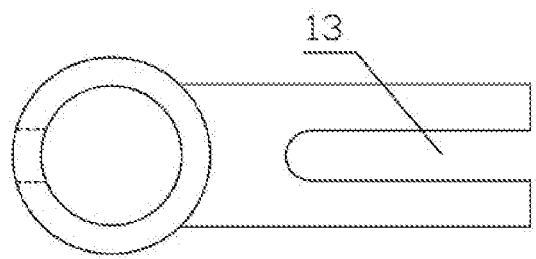
Figure 3:
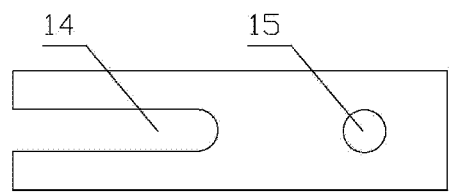

FIG. 1 is a schematic structural diagram of the sprinkler for achieving a high atomization effect under a low pressure condition;

FIGS. 2A-2B show schematic structural diagrams of the top slotted bracket, wherein, FIG. 2A is a front view of the top slotted bracket; FIG. 2B is a top view of the top slotted bracket;

FIG. 3 is a schematic structural diagram of the bottom slotted bracket.

In the figures: 1—precision digital pressure gauge; 2—threaded connecting pipe; 3—valve; 4—slotted bracket; 5—screw rod; 6—low-pressure fine atomizing nozzle; 7—small motor fan; 8—adjustable screw nut; 9—storage battery pack; 10—threaded hole; 11—pipe fitting hole; 12—support plate; 13—U-shaped slot X; 14—U-shaped slot Y; 15—open hole

V. EMBODIMENTS

As shown in FIGS. 1-3, three threaded connecting pipes 2 in length of 100 mm are connected to each other by threads, and a precision digital pressure gauge 1 is connected therebetween to observe the water pressure, and the required water flow pressure can be achieved by adjusting and controlling the valve 3. The low-pressure fine atomizing nozzle 6 is disposed at the outlet of the threaded connecting pipe 2 to jet water flow. A small motor fan 7 is disposed vertically opposite to the low-pressure fine atomizing nozzle 6. The small motor fan 7 consists of a small motor and a fan, wherein, the fan is made of plastic material and has a four-blade propeller, the diameter thereof may be selected according to the required atomization effect, such as 30 mm, 40 mm, 45 mm, or 56 mm. The small motor adopts a Model 130 motor, the motor specification is 15.5*20.3 mm, the motor height is 25 mm, the diameter of output shaft is 2.0 mm, the output shaft length is 8 mm, the rated voltage is 6V, the rotation speed is about 10,000 rpm, and the weight is about 20 g. To further achieve the secondary fragmentation of the jet flow at the nozzle, the small motor fan 7 rotates as the motor is powered by a storage battery pack 9 (a battery case containing four AA dry battery cells, with a cover and a switch), so as to diverge the jet flow; in addition, the low-pressure fine atomizing nozzle 6 can move in the U-shaped slot 14. Both the small motor fan 7 and the storage battery pack 9 are fixed to the bottom slotted bracket, the bottom slotted bracket is connected with the top slotted bracket via a screw rod 5 (a cast iron pole in length of 15-20 mm, with threads along its full length), and the vertical distance between the two slotted brackets can be adjusted by turning an adjustable screw nut 8. The height of the top slotted bracket can be adjusted by screwing and unscrewing of a bolt in a M8 threaded hole 10 in the wall of a pipe fitting hole 11. By moving the screw rod 5 in an open hole 15 of the bottom slotted bracket to the left or right in a U-shaped slot 13, the top slotted bracket and the bottom slotted bracket can move left or right in parallel to each other and the axial distance between the small motor fan 7 and the low-pressure fine atomizing nozzle 6 can be controlled, to achieve a good atomization effect.

The working process is as follows: for example, to sprinkle over a square land in side length of 2 m, a low-pressure atomizing sprinkler is mounted via the threaded connecting pipe to a corresponding frame, and a water pipeline is connected; a threaded connecting pipe in different length may be selected according to the height, so as to adjust the height difference between the nozzle and the plant. An appropriate atomization pressure is realized by adjusting the valve with the aid of the precision digital pressure gauge, and the jet flow is diverged by means of the rotation action of the small motor fan, so as to achieve a good atomization effect. The axial distance between the small motor fan and the low-pressure fine atomizing nozzle can be adjusted by turning the adjustable screw nut on the screw rod, and the lateral distance between the fan and the nozzle can be adjusted by moving the screw rod in the U-shaped slot of the top slotted bracket.

In summary, the sprinkler for achieving a high atomization effect under a low pressure condition according to the present invention belongs to a modern agricultural micro-irrigation apparatus, and comprises a low-pressure fine atomizing nozzle, a small motor fan, a storage battery pack, slotted brackets, a screw rod and adjustable screw nuts, the components of the sprinkler are connected with each other via threads and bolts, and the slotted brackets have U-shaped slot to facilitate movement and fixation of the small motor fan and the storage battery pack; the low-pressure atomizing sprinkler can realize the height adjustment of the sprinkler through threaded connection of the threaded connecting pipe according to the height of the plant to be sprinkled, and the operation is simple. Effective atomization can be achieved under a low pressure (lower than 0.1 MPa) condition and atomization uniformity can be improved by the action of the small motor fan. The sprinkler for achieving a high atomization effect under a low pressure condition is convenient to assemble, the user can quickly install the sprinkler and achieve different atomization effects according to the requirement, so that a single apparatus has multiple functions and effectively overcome drawbacks of the mechanical operation and only functioning in pressure adjustment of the agricultural atomizing sprinklers in the prior art, and it is convenient and flexible to use.

In the description of the present invention, the expressions of reference terms “an embodiment”, “some embodiments”, “exemplary embodiment”, “an example”, “specific example" or "some examples" mean that the specific features, structures, materials or characteristics described in the embodiments or examples are included in at least one embodiment or example of the present invention. In this description, the exemplary expression of the above terms may not necessarily refer to the same embodiment or example. Moreover, the specific features, structures, materials or characteristics described can be combined in any one or more embodiments or examples in a suitable manner.

While the embodiments of the present invention has been illustrated and described, the person skilled in the art can understand that various variations, amendments, substitutions and modifications can be made to the embodiments without departing from the spirit and scope of the present invention, and the scope of the invention is defined by the claims and their equivalents.

We claim:

1. A sprinkler for achieving a high atomization effect under a low pressure condition, comprising a threaded connecting pipe, a low-pressure fine atomizing nozzle, a small motor fan, a storage battery pack, a top slotted bracket, a bottom slotted bracket, a screw rod, and adjustable screw nuts, wherein, the low-pressure fine atomizing nozzle is connected to the threaded connecting pipe, and atomization pressure is adjusted via a valve;

the screw rod is disposed in parallel on one side of the threaded connecting pipe, a top end of the screw rod is connected to the threaded connecting pipe via the top slotted bracket, the bottom slotted bracket is disposed at a bottom end of the screw rod, the small motor fan is disposed on the bottom slotted bracket and comprises a small motor and a m-blade propeller fan, the small motor fan can move left and right in a U-shaped slot of the bottom slotted bracket to adjust an axial distance from the low-pressure fine atomizing nozzle, the adjustable screw nut can be screwed up and down on the screw rod to adjust a lateral distance between the small motor fan and the low-pressure fine atomizing nozzle, and the storage battery pack supplies power to the small motor fan.

2. The sprinkler for achieving a high atomization effect under a low pressure condition according to claim 1 comprising the top slotted bracket comprises a pipe fitting hole and a support plate, and the diameter of the pipe fitting hole is greater than the diameter of the threaded connecting pipe, so that the top slotted bracket can move up and down on the threaded connecting pipe; the pipe fitting hole has a threaded hole in its wall surface, and the top slotted bracket can be fixed by screwing in and out of a bolt with appropriate size in the threaded hole the support plate is disposed at the other end of the top slotted bracket and has a U-shaped slot, so that the screw rod can move left and right in the top slotted bracket.

3. The sprinkler for achieving a high atomization effect under a low pressure condition according to claim 1 the U-shaped slot is provided at one end of the bottom slotted bracket, to realize left and right movement and fixing of the small motor fan; an open hole is provided at the other end of the bottom slotted bracket, via which the screw rod is connected between the top slotted bracket and the bottom slotted bracket; the storage battery pack is fixed on one end of the bottom slotted bracket near the open hole, and comprises a battery case that contains n dry battery cells and is disposed at the lower end of the bottom slotted bracket via waterproof wires.

4. The sprinkler for achieving a high atomization effect under a low pressure condition according to claim 1 comprising the threaded connecting pipe is connected with the low-pressure fine atomizing nozzle via threads.

5. The sprinkler for achieving a high atomization effect under a low pressure condition according to claim 1 comprising the top slotted bracket is connected with the bottom slotted bracket via the screw rod.

6. The sprinkler for achieving a high atomization effect under a low pressure condition according to claim 1 comprising the storage battery is connected to the bottom slotted bracket by adhesive bonding.

7. The sprinkler for achieving a high atomization effect under a low pressure condition according to claim 1 comprising the m-blade propeller is a propeller with one or more blades.

8. The sprinkler for achieving a high atomization effect under a low pressure condition according to claim 3 comprising the n dry battery cells contain one or more dry battery cells.

* * * * *